US011843654B2

(12) United States Patent
Petrie et al.

(10) Patent No.: US 11,843,654 B2
(45) Date of Patent: *Dec. 12, 2023

(54) NETWORK-CONNECTED ACCESS POINT WITH ENVIRONMENTAL SENSOR, AND RELATED COMPONENTS, SYSTEMS, AND METHODS

(71) Applicant: AVAYA MANAGEMENT L.P., Durham, NC (US)

(72) Inventors: Clark D. Petrie, Colts Neck, NJ (US); John H. Yoakum, Cary, NC (US)

(73) Assignee: Avaya Inc., Santa Clara, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/374,701

(22) Filed: Jul. 13, 2021

(65) Prior Publication Data

US 2021/0344738 A1 Nov. 4, 2021

Related U.S. Application Data

(63) Continuation of application No. 14/812,290, filed on Jul. 29, 2015, now Pat. No. 11,095,704.

(51) Int. Cl.
*H04L 67/00* (2022.01)
(52) U.S. Cl.
CPC .................................. *H04L 67/00* (2013.01)
(58) Field of Classification Search
CPC ...................................................... H04L 67/00
See application file for complete search history.

(56) References Cited

U.S. PATENT DOCUMENTS 6,735,450 B1 5/2004 Remmert
7,499,679 B2 3/2009 Yang et al.
(Continued)

FOREIGN PATENT DOCUMENTS

CN 104520840 4/2016

OTHER PUBLICATIONS

Official Action for U.S. Appl. No. 14/812,290, dated Jan. 31, 2018 17 pages.
(Continued)

*Primary Examiner* — Mischita L Henson
(74) *Attorney, Agent, or Firm* — Sheridan Ross P.C.

(57) ABSTRACT

A network-connected access point is disclosed having a network access transceiver configured to provide access to a network for computing devices in communication therewith. The network access point also comprises one or more environmental sensors each configured to determine at least one environmental characteristic value that quantifies an environmental characteristic at a location distant from the network access point. Without limitation, environmental characteristics include temperature, humidity, sound, light, motion, and air quality, The network access point further comprises a sensor controller in communication with the at least one environmental sensor. The sensor controller may be separate from the network access transceiver, or may be part of the same component. The sensor controller is configured to receive the at least one environmental characteristic value from the at least one environmental sensor, and transmit information based on the at least one environmental characteristic value to a network.

20 Claims, 5 Drawing Sheets

(56) References Cited

U.S. PATENT DOCUMENTS

| | | |
|---|---|---|
| 8,610,376 B2 | 12/2013 | Chemel et al. |
| 8,804,622 B1 | 8/2014 | Thai et al. |
| 9,497,830 B1 | 11/2016 | Yoakum et al. |
| 9,666,063 B2 | 5/2017 | Modi et al. |
| 11,095,704 B2 | 8/2021 | Petrie et al. |
| 2002/0144537 A1 | 10/2002 | Sharp et al. |
| 2006/0219473 A1 | 10/2006 | Boland et al. |
| 2008/0267099 A1 | 10/2008 | Curcio et al. |
| 2011/0092164 A1 | 4/2011 | Spanhake |
| 2012/0143356 A1 | 6/2012 | Berg-Sonne et al. |
| 2013/0311140 A1* | 11/2013 | Schechter ............... H04L 67/34 702/188 |
| 2014/0188286 A1 | 7/2014 | Hunka |
| 2014/0217927 A1 | 8/2014 | Quinn |
| 2015/0036488 A1* | 2/2015 | Mettu ..................... H04L 67/34 370/230 |
| 2015/0172985 A1* | 6/2015 | Gangadhar ....... H04W 28/0861 370/332 |
| 2015/0192911 A1 | 7/2015 | Sloop et al. |
| 2017/0034651 A1 | 2/2017 | Yoakum et al. |

OTHER PUBLICATIONS

Official Action for U.S. Appl. No. 14/812,290, dated Aug. 27, 2018 14 pages.

Official Action for U.S. Appl. No. 14/812,290, dated Mar. 19, 2019 18 pages.

Official Action for U.S. Appl. No. 14/812,290, dated Jul. 3, 2019 20 pages.

Official Action for U.S. Appl. No. 14/812,290, dated Oct. 17, 2019 23 pages.

Official Action for U.S. Appl. No. 14/812,290, dated Mar. 2, 2020 23 pages.

Official Action for U.S. Appl. No. 14/812,290, dated Jun. 10, 2020 28 pages.

Official Action for U.S. Appl. No. 14/812,290, dated Oct. 14, 2020 25 pages.

Notice of Allowance for U.S. Appl. No. 14/812,290, dated Apr. 8, 2021 8 pages.

* cited by examiner

NETWORK-CONNECTED ACCESS POINT WITH ENVIRONMENTAL SENSOR, AND RELATED COMPONENTS, SYSTEMS, AND METHODS

RELATED APPLICATIONS

The present application is a continuation of U.S. patent application Ser. No. 14/812,290, filed Jul. 29, 2015, now U.S. Pat. No. 11,095,704, which is incorporated herein by this reference in its entirety.

This application is related to "NETWORK-CONNECTED LIGHTING STRUCTURE WITH CLIMATE SENSOR, AND RELATED COMPONENTS, SYSTEMS, AND METHODS," (application Ser. No. 14/812,203) filed on Jul. 29, 2015, now U.S. Pat. No. 9,497,830, the disclosure of which is hereby incorporated herein by reference in its entirety.

This application is related to "NETWORK-CONNECTED SEMI-FIXED LOCATION TELEPHONE WITH ENVIRONMENTAL SENSOR, AND RELATED COMPONENTS, SYSTEMS, AND METHODS," (application Ser. No. 14/812,348), filed on Jul. 29, 2015, the disclosure of which is hereby incorporated herein by reference in its entirety.

TECHNICAL FIELD

This disclosure is related to an access point, and more specifically to a network-connected access point with an environmental sensor, and related components, systems, and methods.

BACKGROUND

As wireless networks and internet access becomes more commonplace and ubiquitous, network connectivity is now being added to a variety of different devices, including those devices not commonly associated with computing applications. This phenomenon is commonly referred to as the "Internet of Things" (IoT). For many widely deployed devices, these newly added network functions enhance and extend their main functionality. For example, a network-connected thermostat may enable remote control and monitoring of temperature characteristics in a dwelling or other structure. However, this connectivity also permits additional functionality that may not be directly related to the device's primary functionality, or that may interact with the device's primary functionality in unexpected ways.

SUMMARY

Embodiments include a network-connected access point with an environmental sensor, and related components, systems, and methods. In one embodiment, a network-connected access point comprises one or more radio frequency (RF) transceivers with an associated processor and memory that control data transmissions, and an interface to a network configured to provide access to a first network for computing devices in communication therewith. The network-connected access point also comprises one or more environmental sensors each configured to determine at least one environmental characteristic value that quantifies an environmental characteristic at a location distant from the network-connected access point. Without limitation, environmental characteristics include temperature, humidity, sound, light, motion, and air quality. The network-connected access point further comprises a sensor controller in communication with the at least one environmental sensor. The sensor controller may be separate from the controller within the network-connected access point that controls data transmissions, or may be part of the same component. The sensor controller is configured to receive the at least one environmental characteristic value from the at least one environmental sensor, and transmit information based on the at least one environmental characteristic value to a second network, which can be the same as the first network, or can be a different network. One advantage of this arrangement is that a number of access points within a building can gather individual data points relating to one or more environmental characteristics within a defined area, such as a shared space in an office building or a climate-monitored space within a warehouse. Because each access point is stationary with a known (or knowable) location, the individual data points can be used to determine environmental properties of different sub-areas within the defined area. This also has the advantage of providing additional functionality to the access point that is separate from the primary function of the access point, and that leverages the distributed locations of the access points to provide these new functions.

According to one embodiment, a network-connected access point is disclosed. The network-connected access point comprises a network transceiver configured to provide access to a first network for one or more computing devices in communication with the network transceiver. The network-connected access point further comprises at least one environmental sensor configured to determine at least one environmental characteristic value that quantifies an environmental characteristic at a location outside the network-connected access point. The network-connected access point further comprises a sensor controller in communication with the at least one environmental sensor. The sensor controller is configured to receive the at least one environmental characteristic value from the at least one environmental sensor. The sensor controller is further configured to transmit information based on the at least one environmental characteristic value to a second network.

According to another embodiment, a network-connected access point system is disclosed. The system comprises a system controller. The system further comprises a plurality of access points in communication with the system controller via a system network. Each access point comprises a network transceiver configured to provide access to a data network for one or more computing devices in communication with the network transceiver. Each access point further comprises at least one environmental sensor configured to determine at least one environmental characteristic value that quantifies an environmental characteristic at a location outside the network-connected access point. Each access point further comprises a sensor controller in communication with the at least one environmental sensor. The sensor controller is configured to receive the at least one environmental characteristic value from the at least one environmental sensor. The sensor controller is further configured to transmit information based on the at least one environmental characteristic value to the system controller via the system network.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
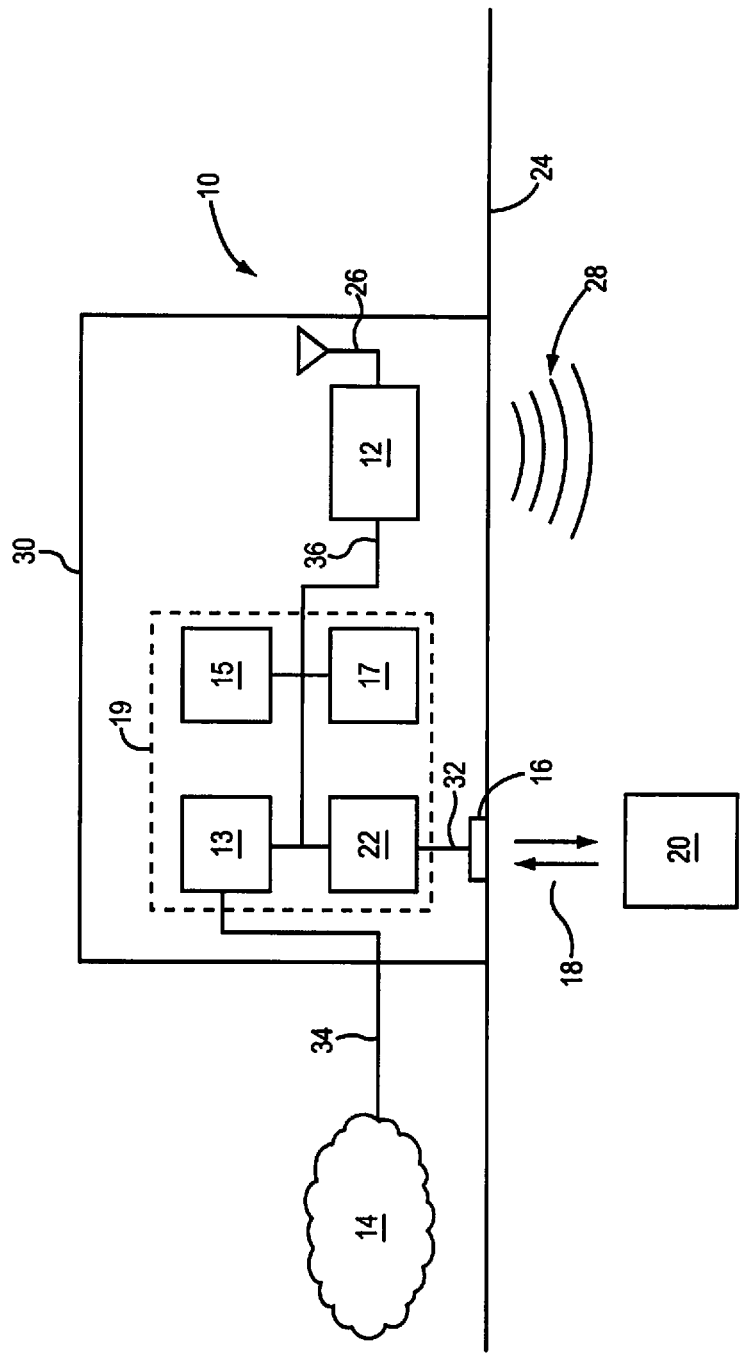
FIG. 1 illustrates a schematic diagram of a network connected access point according to an embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first configuration" and "second configuration," and does not imply a priority, a type, an importance, or other attribute, unless otherwise stated herein.

Embodiments include a network-connected access point with an environmental sensor, and related components, systems, and methods. In one embodiment, a network-connected access point comprises one or more radio frequency transceivers with an associated processor and memory that control data transmissions, and an interface to a network configured to provide access to a first network for computing devices in communication therewith. The network-connected access point also comprises one or more environmental sensors each configured to determine at least one environmental characteristic value that quantifies an environmental characteristic at a location distant from the network-connected access point. Without limitation, environmental characteristics include temperature, humidity, sound, light, motion, and air quality. The network-connected access point further comprises a sensor controller in communication with the at least one environmental sensor. The sensor controller may be separate from the controller within the network-connected access point that controls data transmissions, or may be part of the same component. The sensor controller is configured to receive the at least one environmental characteristic value from the at least one environmental sensor, and transmit information based on the at least one environmental characteristic value to a second network, which can be the same as the first network, or can be a different network. One advantage of this arrangement is that a number of access points within a building can gather individual data points relating to one or more environmental characteristics within a defined area, such as a shared space in an office building or a climate-monitored space within a warehouse. Because each access point is stationary with a known (or knowable) location, the individual data points can be used to determine environmental properties of different sub-areas within the defined area. This also has the advantage of providing additional functionality to the access point that is separate from the primary function of the access point, and that leverages the distributed locations of the access points to provide these new functions.

An access point may be a device which provides access to a network for one or more computing devices. Such access points include wireless network routers or switches, wireless access points, repeaters, and other devices that facilitate connection of computing or other devices to a data or communication network. Many access points are configured to be attached to a surface of a wall or ceiling, may be suspended, may be recessed from a surface of a wall or ceiling, may be located behind a surface of a wall or ceiling, and may be attached to a track structure. Access points may provide access to a single network, or to a plurality of networks. Different networks may be associated with a single access point, or multiple access points creating a single larger coverage area for the network.

In this regard, FIG. 1 illustrates a network-connected access point 10 according to an embodiment. The network-connected access point 10 comprises a radio component 12 comprising one or more radio frequency transceivers connected to a network interface unit 13 and controlled by a processor unit 15 configured to provide access to a network 14 for one or more computing devices (not shown) in communication with the radio component 12. The access point 10 further comprises at least one environmental sensor 16 configured to determine at least one environmental characteristic value that quantifies an environmental characteristic 18 at a location outside the network-connected access point, such as a distant object 20 or an area outside the immediate vicinity of the access point 10. The access point 10 further comprises a sensor controller 22 in communication with the at least one environmental sensor 16. The sensor controller 22 is configured to receive the at least one environmental characteristic value from the at least one environmental sensor 16, and transmit information based on the at least one environmental characteristic value to the network 14. In this embodiment, the information is transmitted on the same network 14 as the one used by the network interface unit 13. It should be understood, however, that the network interface unit 13 and the sensor controller 22 may instead be associated with different networks. The processor unit 15, memory 17, and network interface unit 13 may also be referred to as a network access transceiver module 19. In this embodiment, the sensor controller 22 is part of the network access transceiver module 19, but it should be understood that the sensor controller 22 may be a separate component as well.

In this embodiment as well, the sensor controller 22 is configured to determine the information based on the at least one environmental characteristic value prior to transmitting the information to the network 14. It should be understood that the information may include the raw environmental characteristic value, and may also include information derived from the environmental characteristic value.

In this example, the access point 10 is installed on a ceiling 24, and may be permanently or semi-permanently installed in a known or knowable location on or inside a structure. The information to be transmitted to the network 14 may also include location information corresponding to the installation location of the access point 10.

In this embodiment, the radio component 12 and the sensor controller 22 are disposed in a housing 30. The radio component 12 is also connected to at least one antenna 26 for facilitating wireless communication 28 via one or more radio frequency transceivers within the radio component 12 disposed in or in communication with the network interface unit 13. In this example, the environmental sensor 16 is a motion sensor pointed at a distant object 20 within the line-of-sight of the environmental sensor 16. Here, the environmental sensor 16 is configured to detect movement corresponding to the environmental characteristic 18, i.e., an object in motion, such as the distant object 20 in a location within the environmental sensor's 16 line of sight.

Other types of environmental sensors include temperature sensors configured to detect infrared radiation corresponding to a temperature of an object or area. It should be understood that some types of temperature sensors may be configured to detect infrared radiation in a conical region corresponding to the climate characteristic in a defined area, such as an area intended to be inhabited or monitored, rather than a climate characteristic of an individual object.

It should also be understood that other types of environmental sensors 16 may be used, such as a laser-based temperature sensor, a humidity sensor, an audio sensor, a video sensor, a still or a video camera, or other sensor that is capable of detecting a temperature, humidity, barometric pressure, or other climate characteristic at a location away from the access point 10. For example, an environmental sensor 16 may be configured to detect a sonic characteristic, such as a voice or a predetermined sound type, such as breaking glass. An environmental sensor 16 may also be configured to detect an ambient light characteristic, such as a brightness, a color, an illumination pattern, or a change in a brightness, color or illumination pattern. The environmental sensor 16 may also include a still or video camera in some embodiments. An environmental sensor 16 may also be configured to detect an air quality condition, such as an air visibility level or a presence of smoke. The environmental sensor 16 may also be configured to detect electromagnetic radiation, such as ambient radiation or a manmade electromagnetic signal. For example, the environmental sensor 16 may be configured to detect the presence of an RFID circuit within a detection range of the environmental sensor 16.

It should be understood that some types of sensors may be unsuitable for use with the access point 10. For example, in some embodiments, the environmental characteristic 18 may be an ambient climate characteristic that is distant from the access point 10. This is in contrast to an immediate ambient climate characteristic of the area in the immediate vicinity of the access point 10. In this regard, a temperature gauge that is configured to monitor an immediate ambient climate characteristic of the access point 10 itself or in the immediate vicinity thereof would not be configured to also detect an environmental characteristic 18 at a location away from the access point 10 because an ambient temperature of the access point 10 may be significantly higher than the ambient temperature of a distant object 20 at a remote location away from the access point 10.

In this embodiment, the environmental sensor 16 is connected to the controller by a wired sensor connection 32, but it should be understood that the environmental sensor 16 may alternatively use a wireless communication connection, such as a wireless transmitter, a receiver, and/or a transceiver in other embodiments. Likewise, in this embodiment, the sensor controller 22 is connected to the network 14 via a wired network connection 34, but it should also be understood that the environmental sensor 16 may alternatively use a wireless communication connection in other embodiments. In this embodiment, the processor unit 15 is connected to the network 14 through the network interface unit 13 via a wired connection 36, but here again it should be understood that in other embodiments, the processor unit 15 may be connected directly to the network 14, via wired or wireless connections as well.

In this embodiment, the environmental sensor 16 is a stationary directional motion sensor. It should be understood, however, that other types of environmental sensors 16 may be used. For example, the environmental sensor 16 may have one or more adjustable parameters, such as direction, focus, intensity, or other parameters. For example, the environmental sensor 16 may have a first configuration configured to determine at least one environmental value that quantifies an environmental characteristic at a first location outside the access point 10, and a second configuration configured to determine at least one environmental characteristic value that quantifies an environmental characteristic 18 at a second location outside the access point 10. The parameters may be adjusted manually, remotely, or automatically in response to a determined parameter, for example, via the sensor controller 22. The connection of the sensor controller 22 to the network 14 may also provide for remote discovery, broadcast, provisioning, or reporting of the individual environmental sensors 16 and their respective locations. In another example, the sensor controller 22 may have connectivity to a building thermostat, such that the sensor controller 22 can adjust local temperature settings based on a determined climate characteristic value from the environmental sensor(s) 16. Such connectivity between the sensor controller 22 and building thermostat may be through the network interface unit 13 or through the radio component 12.

In this embodiment, the distant object 20 is illustrated as being located remotely from the access point 10. For example, the distant object 20 may be located on a floor of a structure, or may be part of a piece of furniture in the same room as the access point. Notably, the environmental sensor 16 is not configured to detect an environmental characteristic 18 of the access point 10 itself. For example, an electrical structure, such as the access point 10, may have an internal temperature or other characteristic significantly different than an environmental characteristic 18 of the distant object 20 or the location being measured by the environmental sensor 16. In fact, using the environmental sensor 16 configured to detect the environmental characteristic 18 within or in close proximity to the access point 10 may not be suitable for determining the environmental characteristic 18 of the distant object 20 or the location because the altered characteristic in and around the access point 10 may not accurately reflect the actual environmental characteristics 18 within the overall space in which the access point 10 is installed.

In this embodiment, the access point 10 is configured to be recessed from a surface of the ceiling 24, but it should be understood that the access point 10 may be installed in other manners, such as attached to a surface of a wall or ceiling, suspended from a surface of a wall or ceiling, located behind a surface of a wall or ceiling, or attached to a track structure, for example.

Figure 2:
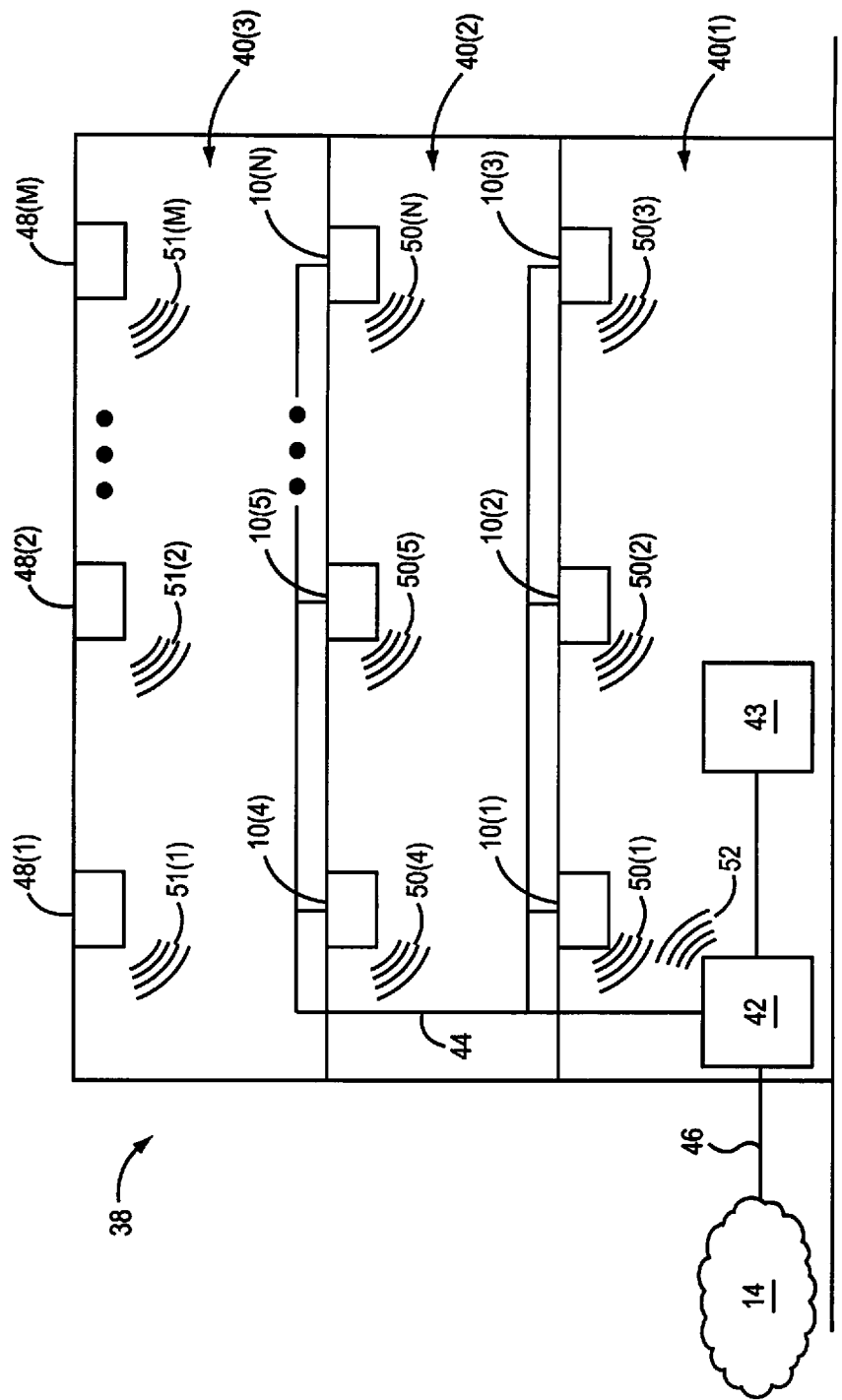
FIG. 2 illustrates a schematic diagram of a network connected lighting system for a multi-story structure employing the access points of FIG. 1 according to an embodiment.

Because most structures have access points distributed throughout the structure, it becomes possible to gather detailed and granular information about the various climate characteristics within the structure. In this regard, FIG. 2 illustrates a diagram of a multi-story building 38 having a plurality of floors 40(1)-40(3). In this embodiment, a plurality of access points 10(1)-10(N) are distributed across the plurality of floors 40(1) and 40(2). Each access point 10(1)-10(N) is in communication with a centralized system controller 42, for example, via the respective network interface unit 13 of each access point 10. In this embodiment, each access point 10 is in communication with the system controller 42 via a wired controller connection 44. The system controller 42 is connected to a larger network 14, such as the internet, via a communication channel 46.

It may also be desirable, however, to include wireless functionality that is capable of operating as an alternative mechanism for communicating with the system controller 42 in addition to providing network access. In this regard, the floor 40(3) of the building 38 includes a plurality of alternative access points 48(1)-48(M). In this embodiment, the internal components of each access point 48 is similar to the internal components of the access point 10 of FIG. 1. In this embodiment, however, rather than requiring a hard wired connection to the system controller 42, each access point 48 communicates with the system controller 42 via a wireless connection. In this embodiment, for example, each access point 10 includes a wireless transceiver 50(1)-50(N), and each access point 48 also includes a wireless transceiver 51(1)-51(M). The wireless transceivers 50(1)-50(N), 51(1)-51(M) may be configured to communicate with each other, and to also communicate with a complementary wireless transceiver 52 in the system controller 42.

In this embodiment, the system controller 42 is able to have connectivity to all of the access points 10(1)-10(N), 48(1)-48(M) simultaneously, thereby allowing the system controller 42 to determine real time information with regard to environmental characteristics 18 throughout the building 38, as well as coordinate network coverage for the different access points 10, 48. This real time information can be used, for example, to control an HVAC system or to communicate the light source functionality of the access points 10, 48 to an installer or a technician. In another non-limiting embodiment, multiple systems or applications may use the determined climate characteristic value and/or information concurrently. For example, these systems or applications may be in communication with the system controller 42, connected to the network 14, or both. It should be noted, however, that the sensor controllers 22 in each access point 10(1)-10(N), 48(1)-48(M) may communicate with a separate environment controller 43. In this alternative embodiment, the system controller 42 may provide a switching or routing function to direct transmissions between the sensor controllers 22 (not shown) and the environment controller 43 via network 14 or an alternative network.

Figure 3:
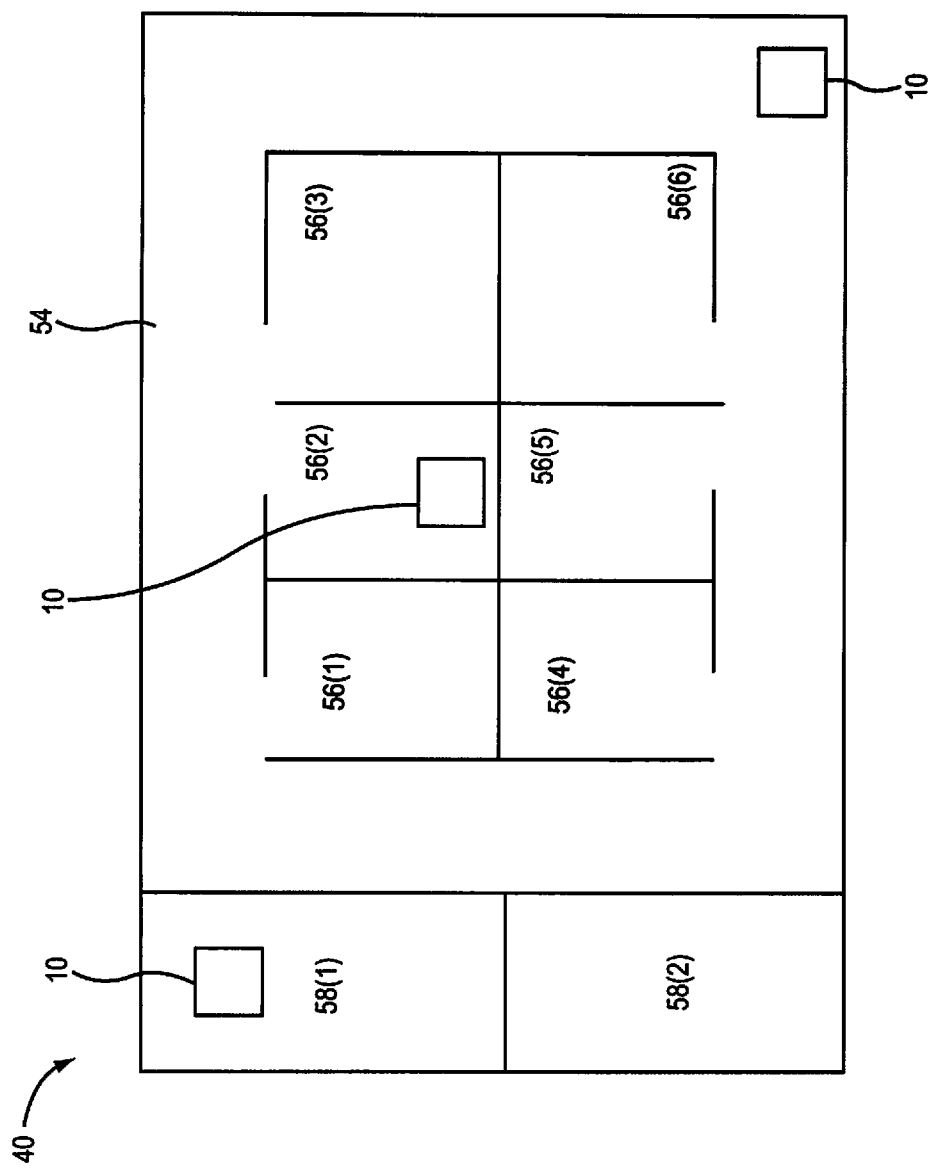
FIG. 3 illustrates a schematic diagram of a floor plan having an array of access points of FIG. 1 according to an embodiment.

In this regard, FIG. 3 illustrates an exemplary simplified floorplan of one of the plurality of floors 40 of the building 38 of FIG. 2. In this example, the floor 40 includes a common area 54 in which a plurality of open cubicles 56(1)-56(6) are arranged. In this example, the floor 40 also includes a pair of closed offices 58(1) and 58(2). The access points 10 are evenly distributed across the ceiling of the floor 40 in this embodiment. It can be seen that the access points 10 may be positioned and distributed such that each area of the floor 40 is within range of at least one access point 10. For example, in this embodiment, each cubicle 56 and each office 58 has at least one access point 10 nearby. Thus, detailed and specific information about any number of environmental characteristics 18 may be determined for a number of different specific locations within the floor 40.

Figure 4:
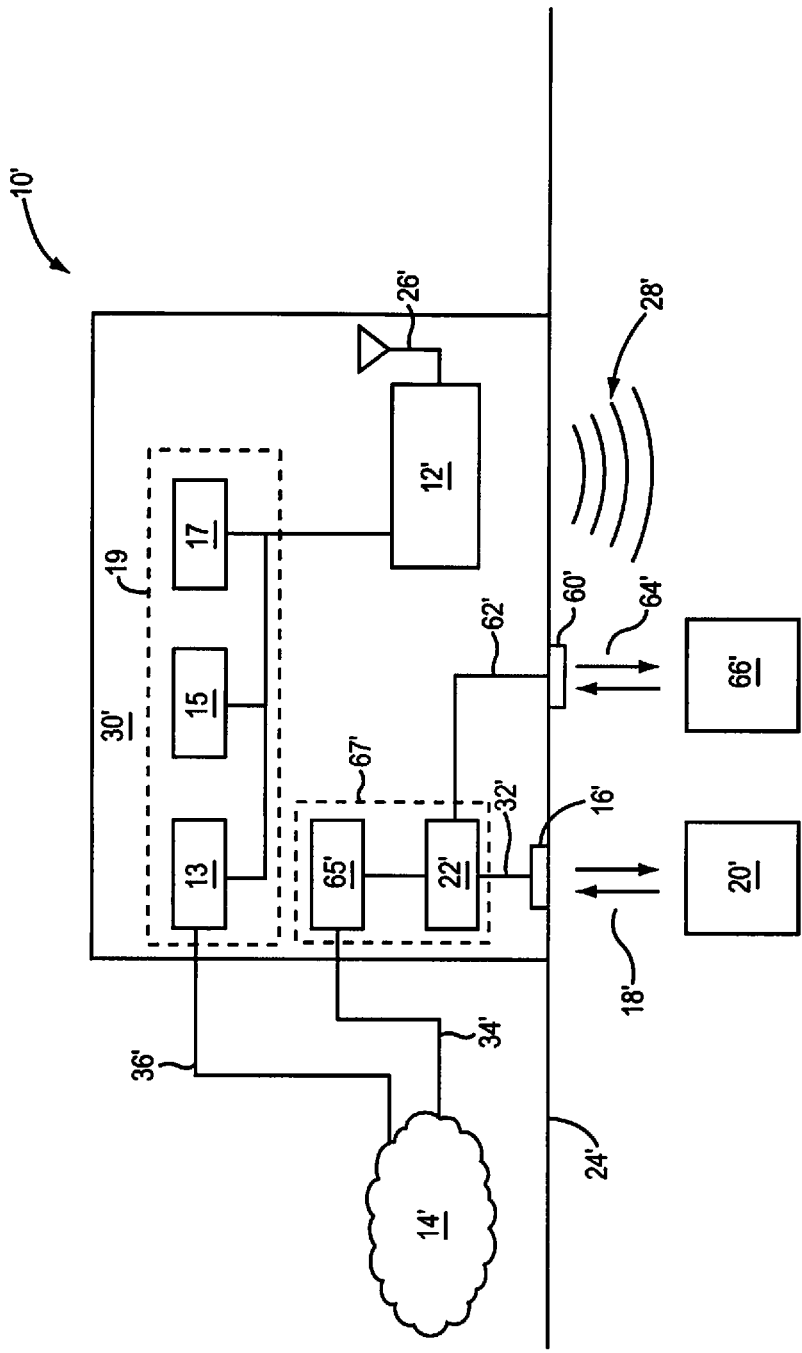
FIG. 4 illustrates a schematic diagram of a network connected access point according to an alternative embodiment.

It should be understood that the environmental sensor 16 is not required to be disposed within or otherwise attached to the housing 30 of the access point 10 to function properly. In this regard, FIG. 4 illustrates an access point 10' according to an alternative embodiment, in which an environmental sensor 16' is located inside a housing 30' of the access point 10' and a second environmental sensor 60' is disposed outside the housing 30'. It should also be understood that the sensor controller 22' and the processor unit 15' may be separate elements and may even be separately connected to network 14'. In another embodiment, the sensor controller 22' and the processor unit 15' may be separately connected to different networks. As with FIG. 1, the environmental sensor 16' of FIG. 4 is connected to the sensor controller 22' via a wired sensor connection 32'. In this embodiment, also, the processor unit 15' is separately connected to the network 14' by a separate wired connection 36' via network interface unit 13', and the sensor controller 22' is connected to the network 14' by a wired connection 34' via network interface unit 65'. As with FIG. 1, however, it should be understood that one or more of the wired connections 32', 34', 36', 62' may be substituted with wireless connections using radio transceivers as desired. In this embodiment, the sensor controller 22' is not separate from the network access transceiver module 19' and is instead is paired with its own network interface unit 65' as part of a standalone sensor controller module 67'.

The second environmental sensor 60' of FIG. 4 may be the same or of a different type as environmental sensor 16'. In this embodiment, the second environmental sensor 60' is connected to the sensor controller 22' via a wired sensor connection 62', and may be similar to the wired sensor connection 32'. The second environmental sensor 60' is positioned to make an environmental measurement of a second environmental characteristic 64' of a distant object or area, which may be the distant object 20 or may be another distant object 66' or other area. In this embodiment, for example, the second environmental sensor 60' is positioned outside the housing 30' in order to have a larger detection area and/or line-of-sight, for example. In some embodiments as well, one or both of the environmental sensors 16', 60' may be a multi-mode sensor that is capable of determining environmental characteristic values for multiple environmental characteristics of different types. One or both of the environmental sensors 16', 60' may also be shared among different applications in some embodiments. In this manner, multiple environmental sensors 16', 60' may be included with a single access point 10' to make environmental measurements of different distant objects or areas.

Figure 5:
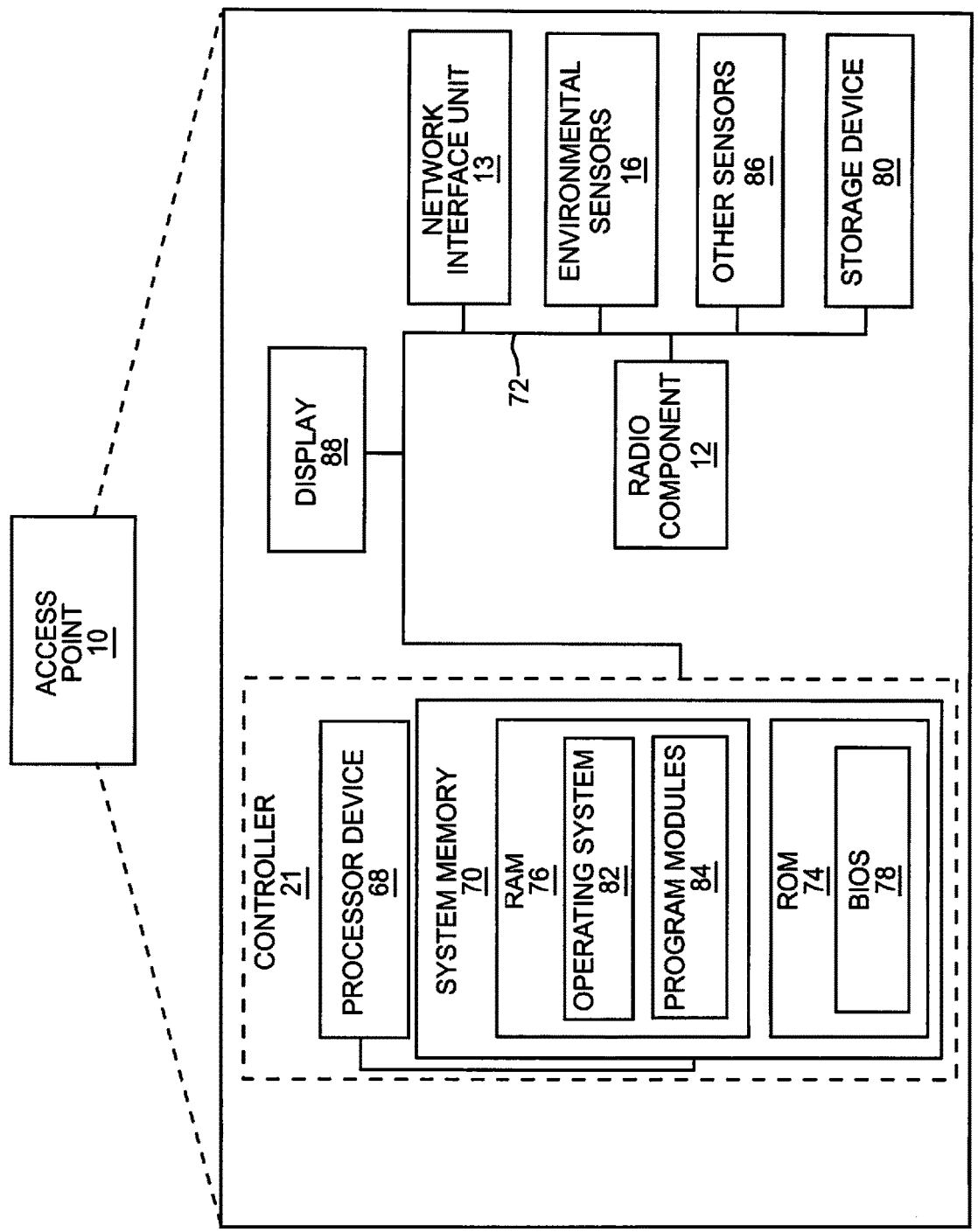
FIG. 5 illustrates a block diagram of a network connected access point according to one embodiment.

FIG. 5 is a block diagram of an access point 10 according to the embodiment of FIG. 1. It should be understood, however, that the components of FIG. 5 may be used with other embodiments herein as well. The access point 10 may comprise any computing or processing device capable of including firmware, hardware, and/or executing software instructions to implement the functionality described herein, and which is capable of being incorporated into components of the access points 10, 10', including, for example, the processor unit 15 and/or the sensor controllers 22, 22'. In this example, the access point 10 of FIG. 5 includes the sensor controller 22 having a processor device 68, a system memory 70, and a system bus 72. The system bus 72 provides an interface for system components including, but not limited to, the system memory 70 and the processor device 68. The processor device 68 can be any commercially available or proprietary processor.

The system bus 72 may be any of several types of bus structures that may further interconnect to a memory bus (with or without a memory controller), a peripheral bus, and/or a local bus using any of a variety of commercially available bus architectures. The system memory 70 may include non-volatile memory 74 (e.g., read only memory (ROM), erasable programmable read-only memory (EPROM), electrically erasable programmable read-only memory (EEPROM), etc.), and/or volatile memory 76 (e.g., random-access memory (RAM)). A basic input/output system (BIOS) 78 may be stored in the non-volatile memory 74 and can include the basic routines that help to transfer the information between the elements within the access point 10.

The access point 10 may further include a computer-readable storage device 80, which may comprise, for example, internal solid state memory, or the like. The computer-readable storage device 80 may provide non-volatile storage of the data, the data structures, the computer-executable instructions, and the like. The data structures can store historical sensor readings which identify the sensor which made the measurement and a timestamp indicating the time the measurement was made. Computer-executable instructions may include pre-defined data processing instructions, or downloaded instructions for data processing at a specified time or interval.

A number of modules can be stored in the computer-readable storage device 80 and/or in the volatile memory 76, including an operating system 82 and one or more program modules 84, which may implement the functionality described herein in whole or in part.

In addition, the access point 10 may include additional components, such as one or more environmental sensors 16, described in detail above, one or more radio components 12, other types of sensors 86, and a display 88 or other visual indicator interface. The components of the access point 10 may interact with other components outside of the access point 10, such as a network 14 (not shown), via a network interface unit 13.

Those skilled in the art will recognize improvements and modifications to the preferred embodiments of the disclosure. All such improvements and modifications are considered within the scope of the concepts disclosed herein and the claims that follow.

What is claimed is:

1. A network-connected access point comprising:
    a network access transceiver configured to provide access to a communication network for one or more computing devices in communication with the network access transceiver;
    a sensor interface for connecting an environmental sensor located outside of a housing of the network-connected access point; and
    a sensor controller in communication with the environmental sensor, the sensor controller configured to:
        receive at least one environmental characteristic value from the environmental sensor; and
        transmit information based on the at least one environmental characteristic value to a monitoring system.

2. The network-connected access point of claim 1, wherein the information includes location information corresponding to an installation location of the network-connected access point.

3. The network-connected access point of claim 1, wherein the environmental sensor comprises an infrared or laser-based temperature sensor and the at least one environmental characteristic is a temperature.

4. The network-connected access point of claim 1, wherein the at least one environmental characteristic is a humidity.

5. The network-connected access point of claim 1, wherein the at least one environmental characteristic is a sonic characteristic.

6. The network-connected access point of claim 5, wherein the sonic characteristic is a sound of breaking glass.

7. The network-connected access point of claim 5, wherein the sonic characteristic is a sound of a voice.

8. The network-connected access point of claim 1, wherein the at least one environmental characteristic is an ambient light characteristic.

9. The network-connected access point of claim 8, wherein the ambient light characteristic is selected from a group consisting of a brightness, a color, an illumination pattern, and a change in the brightness, color or illumination pattern.

10. The network-connected access point of claim 1, wherein the at least one environmental characteristic is air pressure.

11. The network-connected access point of claim 1, wherein the at least one environmental characteristic is an air quality characteristic.

12. The network-connected access point of claim 11, wherein the air quality characteristic is an air visibility level.

13. The network-connected access point of claim 11, wherein the air quality characteristic is a presence of smoke.

14. The network-connected access point of claim 1, further comprising:
    a processor device; and
    a memory configured to store the at least one environmental characteristic value.

15. The network-connected access point of claim 1, wherein the sensor controller is configured to determine the information based on the at least one environmental characteristic value prior to transmitting the information to the monitoring system.

16. The network-connected access point of claim 1, wherein the environmental sensor is a plurality of environmental sensors each configured to determine the at least one environmental characteristic value corresponding to a different environmental characteristic.

17. The network-connected access point of claim 3, further comprising:
    the sensor controller configured to connect to a thermostat, wherein the sensor controller sends a signal to the thermostat to adjust temperature settings based on the temperature.

18. A network-connected access point system comprising:
    a system controller; and
    a plurality of network-connected access points in communication with the system controller via a system network, each of the plurality of network-connected access points comprising:
        a network access transceiver configured to provide access to a data network for one or more computing devices in communication with the network access transceiver;
        a sensor interface for connecting an environmental sensor located outside of a housing of each network-connected access point; and
        a sensor controller in communication with the environmental sensor, the sensor controller configured to:
            receive at least one environmental characteristic value from the environmental sensor; and
            transmit information based on the at least one environmental characteristic value to a monitoring system.

19. The network-connected access point system of claim 18, wherein the environmental sensor comprises an infrared or laser-based temperature sensor and the at least one environmental characteristic is a temperature.

20. The network-connected access point system of claim 19, further comprising:
the sensor controller configured to connect to a thermostat, wherein the sensor controller sends a signal to the thermostat to adjust temperature settings based on the temperature.

* * * * *